United States Patent
Lee

(10) Patent No.: US 9,225,241 B2
(45) Date of Patent: Dec. 29, 2015

(54) PULSE WIDTH MODULATION DC-DC CONVERTER FOR STABILIZING OUTPUT VOLTAGE

(71) Applicant: LG DISPLAY CO., LTD., Seoul (KR)

(72) Inventor: Seungyun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/075,052

(22) Filed: Nov. 8, 2013

(65) Prior Publication Data

US 2014/0145693 A1 May 29, 2014

(30) Foreign Application Priority Data

Nov. 23, 2012 (KR) .................. 10-2012-0134029

(51) Int. Cl.
*H02M 1/00* (2007.01)
*H02M 1/36* (2007.01)
*H02M 3/156* (2006.01)

(52) U.S. Cl.
CPC ............. *H02M 3/156* (2013.01); *H02M 1/00* (2013.01); *H02M 1/36* (2013.01)

(58) Field of Classification Search
USPC ........................... 323/282–290, 901
See application file for complete search history.

(56) References Cited

U.S. PATENT DOCUMENTS

| 6,650,173 | B1 * | 11/2003 | Khouri et al. ............... 327/538 |
| 7,057,380 | B2 * | 6/2006 | Kuo et al. ................... 323/284 |
| 8,552,700 | B2 * | 10/2013 | Dao et al. ................... 323/282 |
| 2007/0013354 | A1 * | 1/2007 | Mok et al. ................... 323/284 |
| 2009/0167267 | A1 * | 7/2009 | Dwarakanath et al. ....... 323/282 |
| 2009/0206810 | A1 * | 8/2009 | Chellamuthu et al. ........ 323/282 |

FOREIGN PATENT DOCUMENTS

CN          1956306 A       5/2007

OTHER PUBLICATIONS

Office Action dated Sep. 16, 2015 for corresponding Chinese Patent Application No. 201310597045.7, 12 pages.

* cited by examiner

*Primary Examiner* — Timothy J Dole
*Assistant Examiner* — Ishrat Jamali
(74) *Attorney, Agent, or Firm* — Brinks Gilson & Lione

(57) ABSTRACT

A PWM DC-DC converter includes a switching unit converting an input voltage into an output voltage, a PID controller producing a PID control voltage, a comparator producing a switching control voltage, a switching controller which supplies a switching control signal to the switching unit, turns on a charge switch and at the same time turns off a discharge switch in an on-period of the switching control voltage, and turns off the charge switch and at the same time turns on the discharge switch in an off-period of the switching control voltage, and an operating point compensation unit which operates in response to an operating point compensation signal and supplies an initialization voltage of a uniform level to a node during a predetermined period for an initial drive.

4 Claims, 4 Drawing Sheets

PULSE WIDTH MODULATION DC-DC CONVERTER FOR STABILIZING OUTPUT VOLTAGE

This application claims the benefit of priority to Korean Patent Application No. 10-2012-0134029 filed on Nov. 23, 2012, which is incorporated herein by reference for all purposes as if fully set forth herein.

BACKGROUND

1. Field of the Disclosure

Embodiments of the disclosure relate to a DC-DC converter for outputting a desired voltage at a constant level.

2. Discussion of the Related Art

In general, a switching regulator is a device for converting energy using an energy storage device, such as an inductor and a capacitor. A DC-DC converter suitably feeds back to the switching regulator and steps up or down an input DC voltage, thereby outputting a DC voltage of a desired level. Examples of the DC-DC converter include a buck converter and a boost converter. The buck converter is a step-down converter to convert a high DC voltage into a relatively low DC voltage, and the boost converter is a step-up converter to convert a low DC voltage into a relatively high DC voltage.

The DC-DC converter has to suitably select circuit elements, such as the inductor and the capacitor, and has to be controlled by a suitable manner. A pulse frequency modulation (PFM) manner and a pulse width modulation (PWM) manner are known as a basic control manner used in the DC-DC converter. The PWM manner has advantages of a small noise and a small ripple and has been used in most of the DC-DC converters.

FIG. 1 illustrates an example of a related art DC-DC converter controlled by a PWM manner. More specifically, FIG. 1 schematically illustrates a step-down converter. As shown in FIG. 1, the related art DC-DC converter includes a switching unit 1, a PID controller 2, a comparator 3, and a switching controller 4. The switching unit 1 includes a charge switch and a discharge switch which are reversely turned on and off in response to a switching control signal received from the switching controller 4, an inductor for storing charged energy, a capacitor for storing discharged energy, etc. and produces an output voltage Vo. The PID controller 2 includes an error amplifier. The PID controller 2 compares the output voltage Vo input to the error amplifier with a previously determined reference voltage and produces a PID control voltage Va. The comparator 3 compares the PID control voltage Va with a ramp voltage Vramp and produces a switching control voltage Vc. The switching controller 4 turns on the charge switch and at the same time turns off the discharge switch in an on-period of the switching control voltage Vc, which is intermittently produced. The switching controller 4 turns off the charge switch and at the same time turns on the discharge switch in an off-period of the switching control voltage Vc.

An operation of the related art DC-DC converter is described in detail. As shown in FIG. 2, when the charge switch is turned on and the discharge switch is turned off in the on-period of the switching control voltage Vc, an input voltage Vi applied by a battery source is charged to the inductor at a slope of $(Vi-Vo)/L1$, where L1 is an inductance of the inductor. Afterward, when the charge switch is turned off and the discharge switch is turned on in the off-period of the switching control voltage Vc, energy charged to the inductor is discharged to a load and the capacitor at a slope of $(-Vo/L1)$. The related art DC-DC converter periodically repeats the charging operation and the discharging operation, thereby holding the output voltage Vo constant. The output voltage Vo is determined by the input voltage Vi and a ratio (i.e., a duty ratio) of on-time to off-time of the charge switch. Thus, a final output of the related art DC-DC converter is expressed by an Equation of $Vo=D*Vi$, where $0<D<1$. FIG. 2 illustrates an on-rate and an off-rate of the charge switch depending on the ramp voltage Vramp and the PID control voltage Va. In FIG. 2, when the PID control voltage Va increases because the output voltage Vo is lower than the reference voltage, a width of the on-period of the switching control voltage Vc increases. On the contrary, when the PID control voltage Va decreases because the output voltage Vo is higher than the reference voltage, a width of the off-period of the switching control voltage Vc increases. The output voltage Vo is controlled through the above-described process, so that it is held at a desired constant level.

The related art DC-DC converter holds the output voltage Vo constant through a negative feedback configuration. However, the related art DC-DC converter does not generate the output voltage Vo depending on operational conditions in an initial drive. More specifically, when the related art DC-DC converter operates for the initial drive, the comparator 3 compares the PID control voltage Va with the ramp voltage Vramp and generates the switching control voltage Vc. The switching control voltage Vc is applied to the switching controller 4 and is used to control switching operations of the charge switch and the discharge switch. However, in the initial drive, the PID control voltage Va output through a node Na has different initial values depending on the operational conditions of the initial drive because of negative feedback characteristics through the PID controller 2. As a result, the related art DC-DC converter shows a conditional situation where the output voltage Vo is not generated depending on the operational conditions because of an influence of the different initial values of the PID control voltage Va.

SUMMARY

In one aspect, there is a PWM DC-DC converter including a switching unit including a charge switch and a discharge switch which are reversely turned on and off, an inductor for storing charged energy, and a capacitor for storing discharged energy, the switching unit configured to convert an input voltage into an output voltage, a PID controller including an error amplifier, the PID controller configured to compare the output voltage input to the error amplifier with a previously determined reference voltage and produce a PID control voltage, a comparator configured to compare the PID control voltage with a ramp voltage and produce a switching control voltage, a switching controller configured to produce a switching control signal based on the switching control voltage, supply the switching control signal to the switching unit, turn on the charge switch and at the same time turn off the discharge switch in an on-period of the switching control voltage, and turn off the charge switch and at the same time turn on the discharge switch in an off-period of the switching control voltage, and an operating point compensation unit configured to operate in response to an operating point compensation signal and supply an initialization voltage of a uniform level to a node Na, to which the PID control voltage is output, during a predetermined period for an initial drive.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE
ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Exemplary embodiments of the invention are described below with reference to FIGS. 3 and 4.

Figure 3:
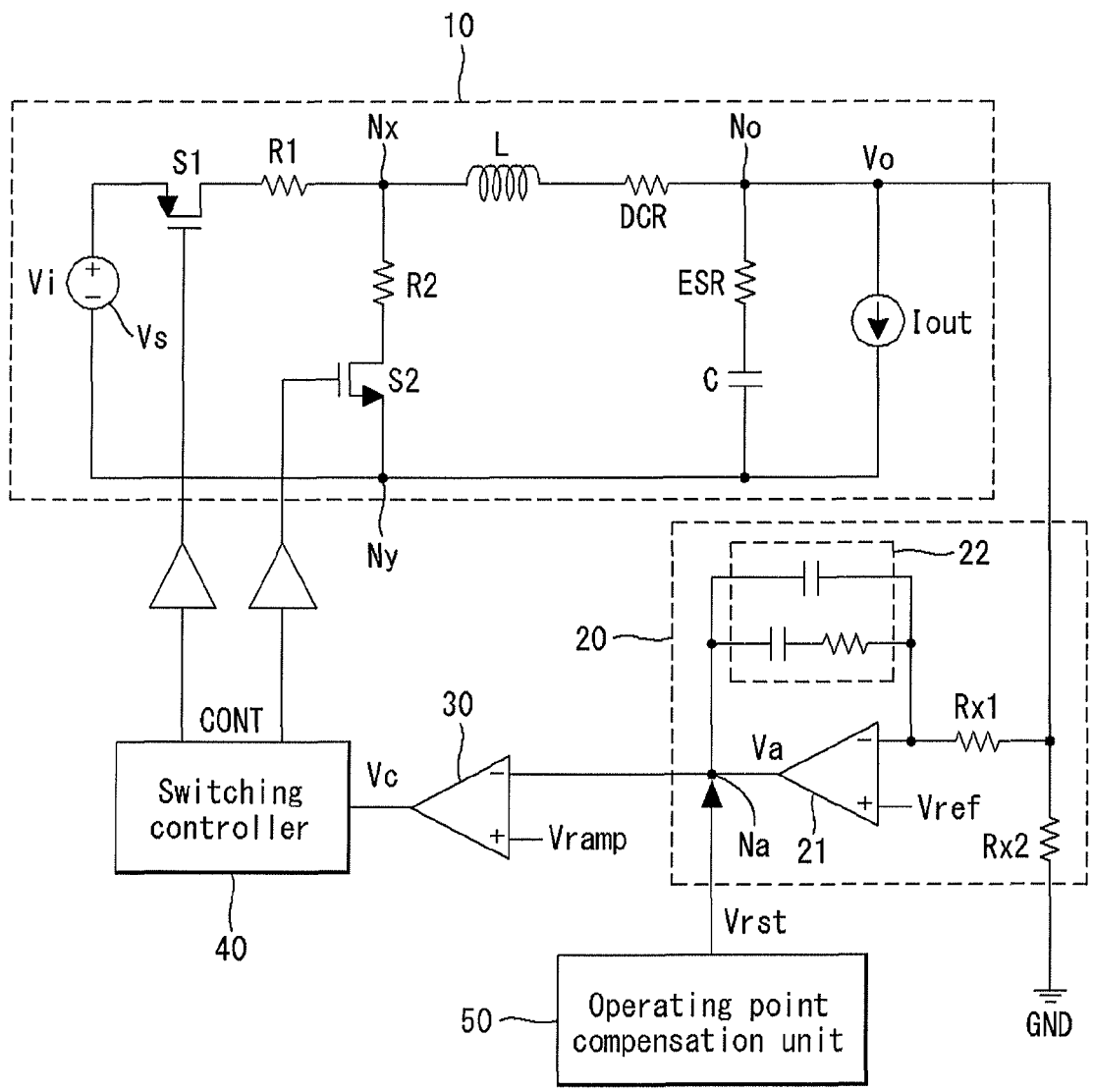
FIG. 3 illustrates a pulse width modulation (PWM) DC-DC converter according to an exemplary embodiment of the invention.

FIG. 3 illustrates a pulse width modulation (PWM) DC-DC converter according to an exemplary embodiment of the invention.

As shown in FIG. 3, a PWM DC-DC converter according to an exemplary embodiment of the invention includes a switching unit 10, a PID controller 20, a comparator 30, a switching controller 40, and an operating point compensation unit 50.

The switching unit 10 includes a charge switch S1 and a discharge switch S2 which are reversely turned on and off in response to a switching control signal CONT received from the switching controller 40, an inductor L for storing charged energy, a capacitor C for storing discharged energy, etc. The switching unit 10 produces an output voltage Vo by stepping down an input voltage Vi. A connection configuration of the switching unit 10 is described in detail. The switching unit 10 includes an input power source Vs for applying the input voltage Vi, the charge switch S1 and a resistor R1 connected in series with each other between the input power source Vs and a node Nx, a resistor R2 and the discharge switch S2 connected in series with each other between the node Nx and a node Ny, the inductor L and a resistor DCR connected in series with each other between the node Nx and a node No, a resistor ESR and the capacitor C connected in series with each other between the node No and the node Ny, and an output current source Iout connected in parallel with the resistor ESR and the capacitor C between the node No and the node Ny. Because the switching unit 10 includes the inductor L and the capacitor C, operation characteristic of the switching unit 10 is implemented a second order system.

The PID controller 20 has two zeros and three poles and performs frequency compensation, so as to stabilize an oscillation phenomenon generated in the switching unit 10. The PID controller 20 includes an error amplifier 21 and a negative feedback unit 22. The PID controller 20 compares the output voltage Vo input to the error amplifier 21 with a previously determined reference voltage Vref and produces a PID control voltage Va. The error amplifier 21 includes a negative terminal (−) receiving the output voltage Vo from the switching unit 10 through a resistor Rx1, a positive terminal (+) receiving the reference voltage Vref, and an output terminal connected to a node Na. The PID control voltage Va produced in the error amplifier 21 is applied to the node Na. The negative feedback unit 22 is connected between the negative terminal (−) of the error amplifier 21 and the node Na and implements the negative feedback. A resistor Rx2 may be connected between the node No and a ground level voltage source GND.

The comparator 30 compares the PID control voltage Va with a ramp voltage Vramp and produces a switching control voltage Vc. The comparator 30 includes a negative terminal (−) receiving the PID control voltage Va from the PID controller 20, a positive terminal (+) receiving the ramp voltage Vramp, and an output terminal outputting the switching control voltage Vc.

Figure 1:
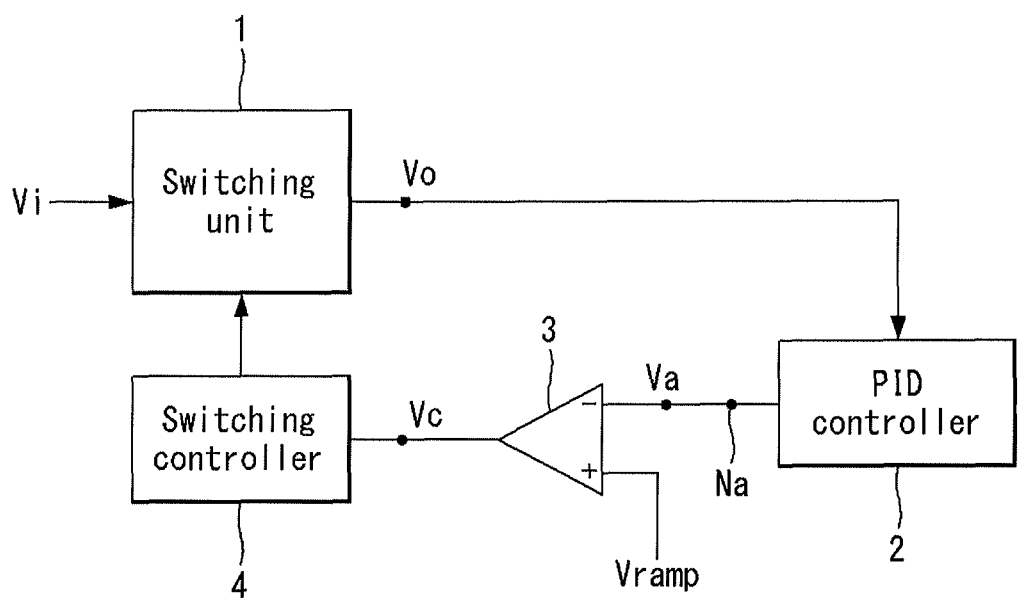
FIG. 1 illustrates an example of a related art DC-DC converter.
Figure 2:
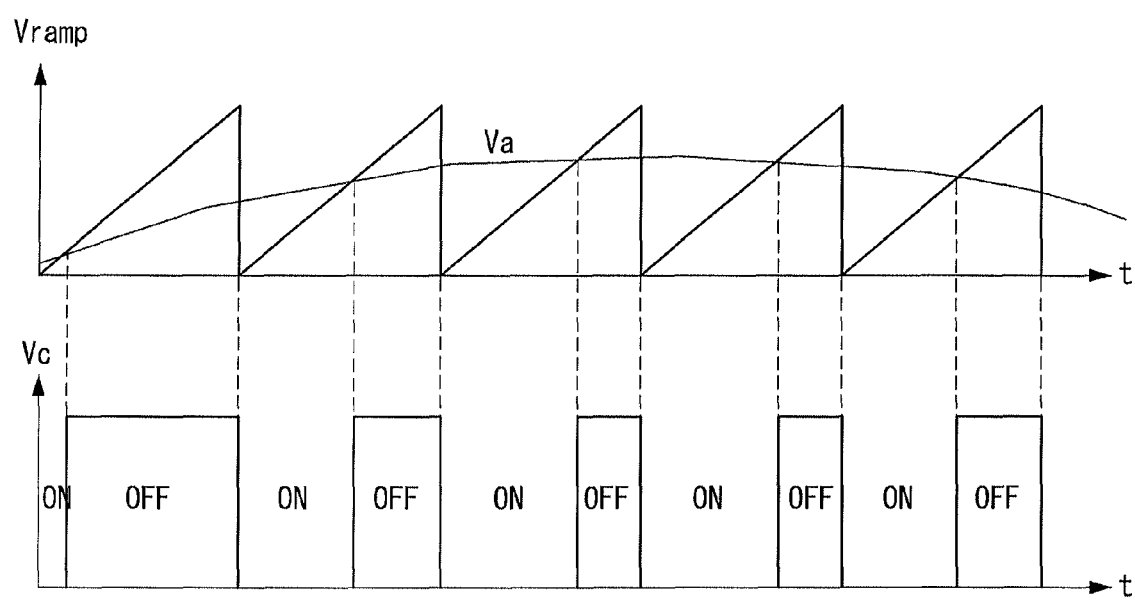
FIG. 2 illustrates an on-rate and an off-rate of a charge switch depending on a ramp voltage and a PID control voltage in a related art DC-DC converter.

The switching controller 40 receives the switching control voltage Vc from the comparator 30 and outputs the switching control signal CONT. The switching controller 40 applies the switching control signal CONT to the switching unit 10. Hence, the switching controller 40 turns on the charge switch S1 and at the same time turns off the discharge switch S2 in an on-period of the switching control voltage Vc, which is intermittently produced as shown in FIG. 2. Further, the switching controller 40 applies the switching control signal CONT to the switching unit 10, thereby turning off the charge switch S1 and at the same time turning on the discharge switch S2 in an off-period of the switching control voltage Vc.

The operating point compensation unit 50 operates in response to an operating point compensation signal received from the outside and supplies an initialization voltage Vrst of a uniform level to the node Na. The operating point compensation unit 50 operates only during a predetermined period (i.e., an initial driving period), in which the DC-DC converter is initially driven, and stops operating during a normal driving period following the initial driving period. The operating point compensation unit 50 uniformly resets the node Na to the initialization voltage Vrst of a desired level irrespective of operational conditions, thereby improving operational characteristics of the DC-DC converter. Hence, the problem, in which the output voltage Vo is not generated depending on the operational conditions in an initial drive of the DC-DC converter, is solved. In the initial driving period, the initialization voltage Vrst produced by the operating point compensation unit 50 is applied to the node Na. In the normal driving period, the PID control voltage Va produced by the PID controller 20 is applied to the node Na.

An operation of the PWM DC-DC converter according to the embodiment of the invention is described in detail. When the charge switch S1 is turned on and the discharge switch S2 is turned off in the on-period of the switching control voltage Vc shown in FIG. 2, the input voltage Vi applied by the input power source Vs is charged to the inductor L at a slope of (Vi−Vo)/L1, where L1 is an inductance of the inductor L. Afterward, when the charge switch S1 is turned off and the discharge switch S2 is turned on in the off-period of the switching control voltage Vc shown in FIG. 2, energy charged to the inductor L is discharged to a load side and the capacitor C at a slope of (−Vo/L1). The PWM DC-DC converter according to the embodiment of the invention periodically repeats the charging operation and the discharging operation in a normal drive, thereby holding the output voltage Vo constant. The output voltage Vo is determined by the input voltage Vi and a ratio (i.e., a duty ratio) of on-time to off-time of the charge switch S1. Thus, a final output of the PWM DC-DC converter according to the embodiment of the invention is expressed by an Equation of Vo=D*Vi, where 0<D<1. As shown in FIG. 2 illustrating an on-rate and an off-rate of the charge switch depending on the ramp voltage Vramp and the PID control voltage Va, when the PID control voltage Va increases because the output voltage Vo is lower than the reference voltage Vref, a width of the on-period of the switching control voltage Vc increases. On the contrary, when the PID control voltage Va decreases because the output voltage Vo is higher than the reference voltage Vref, a width of the off-period of the switching control voltage Vc increases. The PWM DC-DC converter according to the embodiment of the invention holds the output voltage Vo constant through a negative feedback configuration.

In the initial drive, the PID control voltage Va output through the node Na has different initial values depending on the operational conditions of the initial drive because of negative feedback characteristics through the PID controller 20. However, the related art showed a conditional situation where the output voltage Vo is not generated depending on the operational conditions because of an influence of the different initial values of the PID control voltage Va. On the other hand, the embodiment of the invention uniformly resets the node Na to the initialization voltage Vrst of the desired level irrespective of the operational conditions using the operating point compensation unit 50, thereby solving the problem of the related art.

Figure 4:
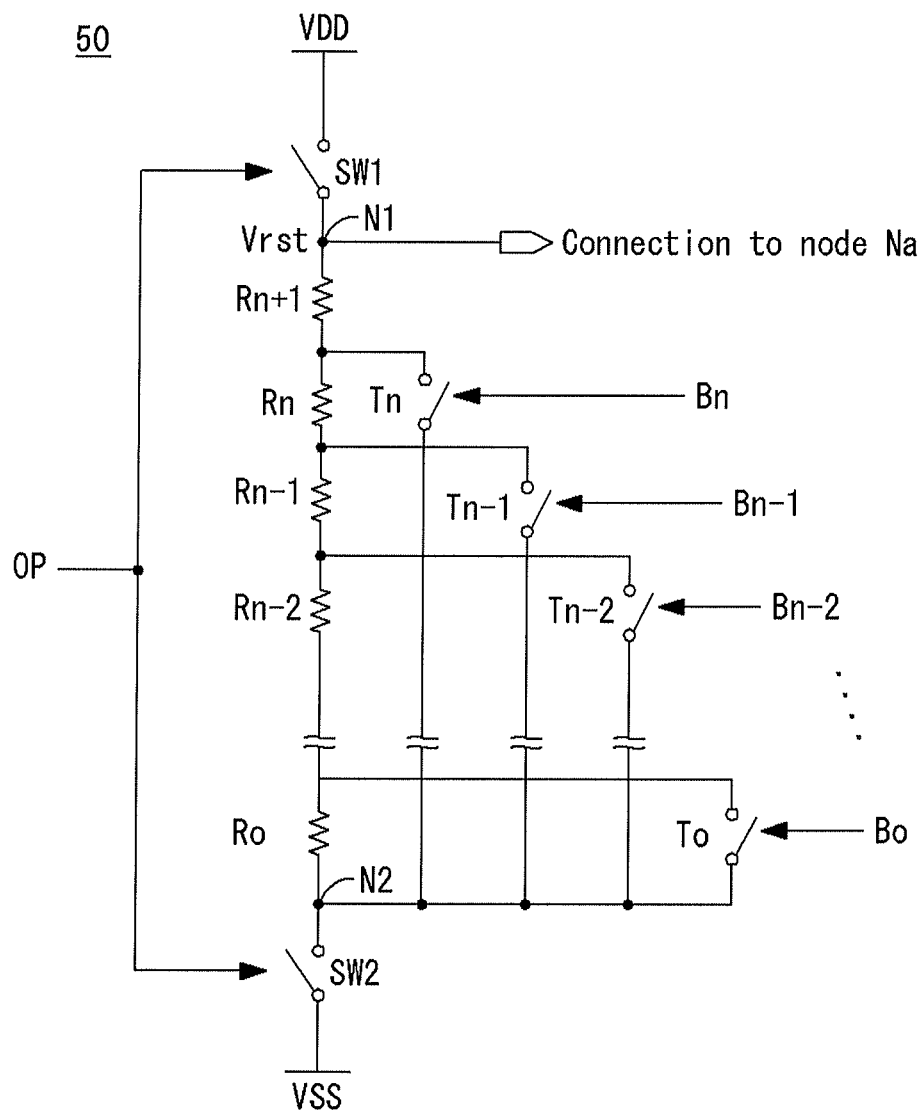
FIG. 4 illustrates an example of an operating point compensation unit shown in FIG. 3.

FIG. 4 illustrates an example of the operating point compensation unit 50 shown in FIG. 3.

As show in FIG. 4, the operating point compensation unit 50 includes a first node N1 and a second node N2 respectively connected to both sides of a resistor string, a first activation switch SW1 which is connected between a high potential voltage source VDD and the first node N1 and is turned on or off in response to an operating point compensation signal OP, and a second activation switch SW2 which is connected between a low potential voltage source VSS and the second node N2 and is turned on or off in response to the operating point compensation signal OP. The initialization voltage Vrst determined by the resistor string, in which an electric current flows, is applied to the first node N1 and is supplied to the node Na connected to the first node N1.

The operating point compensation signal OP is generated at an activation level only during a predetermined period (i.e., the initial driving period), in which the DC-DC converter is initially driven. The first activation switch SW1 and the second activation switch SW2 are turned on only during the initial driving period and are turned off during the normal driving period following the initial driving period in response to the operating point compensation signal OP. When the first activation switch SW1 and the second activation switch SW2 are turned on, the node Na is reset to the initialization voltage Vrst.

The initialization voltage Vrst may be set to various values corresponding to various targets of the output voltage Vo. For this, the operating point compensation unit 50 further includes a plurality of voltage determination switches T0 to Tn which are connected between voltage division nodes of the resistor string and the second node N2. Each of the voltage determination switches T0 to Tn is turned on or off in response to voltage determination control signals B0 to Bn for determining the level of the initialization voltage Vrst. Each of the voltage determination control signals B0 to Bn is configured by one of "1" indicating a turn-on and "0" indicating a turn-off and may be received from the outside. Although not shown in FIG. 4, current sources are connected between the high potential voltage source VDD and the first activation switch SW1 and between the low potential voltage source VSS and the second activation switch SW2, respectively.

As described above, the embodiment of the invention uniformly resets the node Na (receiving the PID control voltage produced by the PID controller) to the initialization voltage Vrst of the desired level irrespective of the operational conditions, thereby improving the operational characteristics of the DC-DC converter. Hence, the embodiment of the invention may stably produce the output voltage irrespective of the operational conditions. Further, the embodiment of the invention may adjust the initialization voltage correspondingly to various targets of the output voltage, thereby rapidly tracking the output voltage to a given target. Hence, the embodiment of the invention may greatly reduce a time required to reach the given target of the output voltage in the initial drive.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pulse width modulation DC-DC converter comprising:
 a switching unit including a charge switch and a discharge switch which are reversely turned on and off, an inductor that stores charged energy, and a capacitor that stores discharged energy, the switching unit configured to convert an input voltage into an output voltage;
 a PID controller including an error amplifier, the PID controller configured to compare the output voltage input to the error amplifier with a previously determined reference voltage and produce a PID control voltage;
 a comparator configured to compare the PID control voltage with a ramp voltage and produce a switching control voltage;
 a switching controller configured to produce a switching control signal based on the switching control voltage, supply the switching control signal to the switching unit, turn on the charge switch and at the same time turn off the discharge switch in an on-period of the switching control voltage, and turn off the charge switch and at the same time turn on the discharge switch in an off-period of the switching control voltage; and
 an operating point compensation unit configured to operate in response to an operating point compensation signal and supply an initialization voltage of a uniform level to a node Na, to which the PID control voltage is output, only during an initial drive period, the operating point compensation unit comprising
 a resistor string,
 a first node and a second node respectively connected to both sides of the resistor string,
 a first activation switch connected between a high potential voltage source and the first node, and
 a second activation switch connected between a low potential voltage source and the second node,
 wherein the first and second activation switches are turned on or off simultaneously in response to the operating compensation signal, and
 wherein the first and second activation switches are turned on during the initial driving period to allow the operating point compensation unit to supply the initialization voltage to the node Na, and the first and second activation switches are turned off during a normal driving period following the initial driving period to cause the operating point compensation unit to stop supplying the initialization voltage to the node Na.

2. The pulse width modulation DC-DC converter of claim 1,
wherein the first node is connected to the node Na, and the initialization voltage determined by the resistor string, in which an electric current flows, is applied to the first node.

3. The pulse width modulation DC-DC converter of claim 2, wherein the first activation switch and the second activation switch are turned on only during the predetermined period for the initial drive and are turned off during a normal driving period following the initial driving period in response to the operating point compensation signal, and
wherein when the first activation switch and the second activation switch are turned on, the node Na is reset to the initialization voltage.

4. The pulse width modulation DC-DC converter of claim 2, wherein the operating point compensation unit further includes a plurality of voltage determination switches connected between voltage division nodes of the resistor string and the second node, and
wherein each of the voltage determination switches is turned on or off in response to voltage determination control signals for determining a level of the initialization voltage.

* * * * *